United States Patent [19]

Patsch et al.

[11] 4,393,005
[45] Jul. 12, 1983

[54] CATIONIC PHTHALOCYANINE DYES

[75] Inventors: Manfred Patsch, Wachenheim; Manfred Ruske, Ludwigshafen; Erwin Hahn, Heidelberg, all of Fed. Rep. of Germany

[73] Assignee: BASF Aktiengesellschaft, Rheinland-Pfalz, Fed. Rep. of Germany

[21] Appl. No.: 357,808

[22] Filed: Mar. 15, 1982

[30] Foreign Application Priority Data

Mar. 21, 1981 [DE] Fed. Rep. of Germany ....... 3111199

[51] Int. Cl.³ ............................................. C09B 47/04
[52] U.S. Cl. ............................ 260/245.73; 260/242.2; 260/245.1; 260/245.76
[58] Field of Search ............. 260/242.2, 245.1, 245.73, 260/245.76

[56] References Cited

U.S. PATENT DOCUMENTS 3,709,903 1/1973 Jefferies et al. ............. 260/245.81 X
4,069,064 1/1978 Nett et al. .................... 260/242.2 X Primary Examiner—Richard Raymond
Attorney, Agent, or Firm—Oblon, Fisher, Spivak, McClelland & Maier

[57] ABSTRACT

Cationic phthalocyanine dyes of the formula

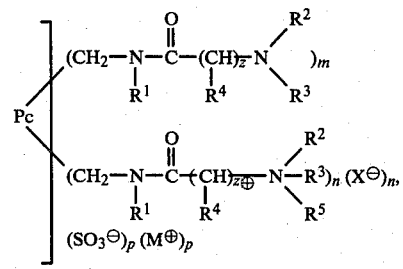

where Pc is an $(m+n+p)$-valent phthalocyanine radical, $R^1$ is H or alkyl, $R^2$ and $R^3$ independently of one another are alkyl, hydroxyalkyl, cycloalkyl, benzyl, phenyl or tolyl, or

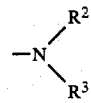

is pyrrolidinyl, imidazolyl, 2-ethyl-4-methylimidazolyl, morpholinyl, piperazinyl or N'-alkylpiperazinyl, or is

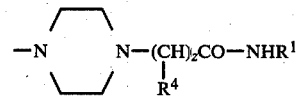

$R^4$ is H or methyl, $R^5$ is alkyl, hydroxyalkyl or benzyl, $X^\ominus$ is one equivalent of an anion, $M^\oplus$ is one equivalent of a cation, z is 1 or 2, p is 0 or 1, m is 0 to 1 and n is from 1 to 4, and $1 \leq (m+n) \leq 4$, are readily or highly soluble in water and very substantive on paper, and accordingly are particularly suitable for dyeing and printing paper. Paper dyed with (I) has very good bleeding fastness, and a colorless effluent is obtained when paper is wetened dyed.

9 Claims, No Drawings

CATIONIC PHTHALOCYANINE DYES

The present invention relates to novel cationic phthalocyanine dyes and their use.

The novel dyes have the general formula

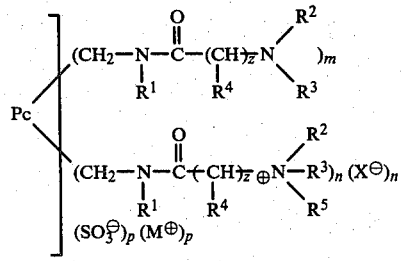
(I)

where Pc is an (n+m+p)-valent radical of a phthalocyanine, $R^1$ is hydrogen or $C_1$–$C_4$-alkyl, $R^2$ and $R^3$ independently of one another are $C_1$–$C_{14}$-alkyl, $C_2$–$C_4$-hydroxyalkyl, $C_5$–$C_8$-cycloalkyl, benzyl, phenyl or tolyl, or

is a pyrrolidine, imidazole, 2-ethyl-4-methylimidazole, morpholine, piperazine or N'—$C_1$–$C_4$-alkylpiperazine radical, or is

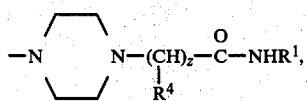

$R^4$ is hydrogen or methyl, $R^5$ is $C_1$–$C_{12}$-alkyl, or $C_2$–$C_4$-hydroxyalkyl, which may be substituted by chlorine, or is benzyl, $X^\ominus$ is one equivalent of an anion, $M^\oplus$ is one equivalent of a cation, z is 1 or 2, p is 0 or 1, m is 0 or 1 and n is 1, 2, 3 or 4, and 1<(m+n)<4.

Dyes where m is 0 and p has an average value of from 0 to 0.5, in particular 0 (zero), are preferred. The dyes (I) are readily or highly soluble in dilute acid and in water. In spite of their high solubility, they are very highly substantive on paper, which means that paper dyed or printed with them has excellent bleeding fastness, ie. does not stain adjacent white material in the presence of dilute acid, such as lactic acid or acetic acid, dilute aqueous alkali or salt solution, dilute alcohol, oil or milk (test according to DIN No. 53,991).

For the above reasons, the dyes according to the invention are outstandingly suitable for wet-end dyeing and printing paper, for example by the flexographic method.

The dyes I, and especially those where m is 0, p is 0 and $R^5$ is 2-hydroxyethyl or benzyl, are particularly suitable for aqueous flexographic printing inks. The prints obtained with these dyes have outstanding fastnesses, such as water, oil, alkali and acid fastness.

Thus, for example, the dye of the formula I where $R^1$ and $R^4$ are both H, m is 0, n is 1.3, z is 1, $X^\ominus$ is HO$^\ominus$ and

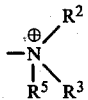

is

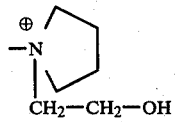

has a higher bleeding fastness according to DIN No. 53,991 and also a higher lightfastness than the pyridinium compound disclosed in German Pat. No. 1,029,965, Example 1a, which is to be regarded as the closest prior art compound.

Because the dyes (I) are highly substantive, a colorless effluent is obtained when paper is wet-end dyed.

The good solubility of the dyes (I) enables liquid formulations to be obtained. These are increasingly preferred in the paper industry, since they permit dust-free operation and a simple reproducible metering of the dyes for dyeing.

The dyes (I) also have the advantage that the paper dyed with them can be bleached. This property could not be predicted for the highly substantive dyes according to the present invention, which have a very high level of other fastnesses, coupled with the wetfastness properties. The ability of paper dyed with (I) to be bleached is of great advantage in re-using waste and used paper, since a virtually colorless pulp can be obtained during reprocessing.

Besides hydrogen, suitable substituents $R^1$ include $C_1$–$C_4$-alkyl, eg. methyl, ethyl, propyl or butyl. $R^1$ is preferably hydrogen.

Apart from the radicals already mentioned by name, specific examples of $R^2$ and $R^3$ are $C_1$–$C_{14}$-alkyl, $C_2$–$C_4$-hydroxyalkyl and $C_5$–$C_8$-cycloalkyl such as methyl, ethyl, n-propyl, i-propyl, n-butyl, i-butyl, n-amyl, i-amyl, n-hexyl, i-hexyl, heptyl, octyl, 2-ethylhexyl, decyl, dodecyl, tridecyl, tetradecyl, 2-hydroxyethyl, 2- and 3-hydroxypropyl, cyclopentyl, cyclohexyl and cyclooctyl.

$R^2$ and $R^3$ can be identical or different.

Furthermore,

can be a radical which is derived from pyrrolidine, imidazole, 2-ethyl-4-methylimidazole, morpholine, piperazine or N—$C_1$–$C_4$-alkylpiperazine, eg. N-methyl- or N-ethyl-piperazine, or can be a piperazine radical of the formula:

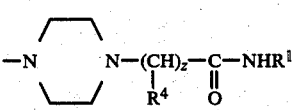

Preferably, $R^2$ and $R^3$ are $C_1$–$C_5$-alkyl, or

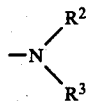

is morpholinyl, piperidinyl or pyrrolidinyl. Di-n-propylamino, di-n-butylamino, morpholinyl and pyrrolidinyl are particularly preferred for

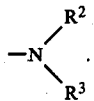

$R^4$ is methyl or, preferably, hydrogen.

Specific examples of $R^5$ are $C_1$–$C_{12}$-alkyl and $C_2$–$C_4$-hydroxyalkyl such as methyl, ethyl, n- and i-propyl, n- and i-butyl, n- and i-amyl, n- and i-hexyl, octyl, 2-ethylhexyl, decyl, dodecyl, 2-hydroxyethyl, 2- and 3-hydroxypropyl, 2-hydroxy-3-chloropropyl and hydroxybutyl, and benzyl.

$R^5$ is preferably $C_1$–$C_4$-alkyl, 2-hydroxyethyl, 2-hydroxy-3-chloropropyl or benzyl, and of these radicals methyl, 2-hydroxyethyl, 2-hydroxy-3-chloropropyl and benzyl are preferred. 2-Hydroxyethyl and benzyl are particularly preferred for $R^5$.

Examples of suitable anions $X^\ominus$ are $OH^\ominus$, benzenesulfonate, o- and p-toluene-sulfonate, $Cl^\ominus$, $\tfrac{1}{2}SO_4^{2\ominus}$, $CH_3OSO_3^\ominus$, acetate, methoxyacetate, lactate, $H_5C_2OSO_3^\ominus$ and $\tfrac{1}{2}ZnCl_4^{2\ominus}$, of which $Cl^\ominus$, acetate, methoxyacetate, lactate and $HO^\ominus$ are preferred.

Where (m+n)>1, the dyes can be in the form of mixtures, and it is also possible for the average value of m and n to be a fraction.

Preferably, (m+n) is from 1 to 4, and m is preferably 0 (zero).

Dyes where n is from 1 to 3 and m is 0 are particularly preferred.

p is 0 or 1. Mixtures of dyes 1 where p is 0 and those where p is 1, the average value of p being from 0 to 0.5, are preferred. In particular, p is 0.

Examples of suitable cations M! are alkali metal and akaline earth metal ions such as $Na^\oplus$, $K^\oplus$, $Li^\oplus$, $\tfrac{1}{2}Ca^{2\oplus}$, $\tfrac{1}{2}Mg^{2\oplus}$ and ammonium.

Suitable (m+n+p)-valent phthalocyanine radicals Pc include those which are derived from copper, cobalt, nickel, zinc, aluminum or iron phthalocyanines or from metal-free phthalocyanine. The phthalocyanines may contain not more than 2 chlorine atoms in the molecule.

Preferred dyes of the formula I are those in which Pc is derived from copper phthalocyanine. The dyes described in the Examples are particularly preferred.

Dyes of the formula VI

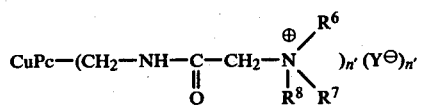 (VI)

where n' is 1, 2 or 3, $R^6$ and $R^7$ are $C_1$–$C_5$-alkyl, or

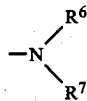

is morpholinyl or pyrrolidinyl, and $R^8$ is $C_1$–$C_4$-alkyl, 2-hydroxyethyl, 2-hydroxy-3-chloropropyl or benzyl and $Y^\ominus$ is $HO^\ominus$, benzenesulfonate, toluenesulfonate, $Cl^\ominus$, $CH_3OSO_3^\ominus$, acetate, methoxyacetate or lactate, are noteworthy because of their outstanding properties.

Of these dyes, those of the formula VI where

is di-n-propylamino, di-n-butylamino or pyrrolidinyl, $R^8$ is 2-hydroxyethyl or benzyl and $Y^\ominus$ is $HO^\ominus$, acetate, methoxyacetate or lactate are particularly preferred.

The compounds of the formula VI can also be used as additives for improving the properties of pigments, especially those of phthalocyanine pigments in printing inks and paints.

For this purpose, the pigment can be used in a formulation together with the cationic Cu-Pc compound, but it is also possible to add pigments and a compound (VI) to the binder and to grind them in the binder solution.

Compounds which are particularly suitable for this purpose are those of the formula

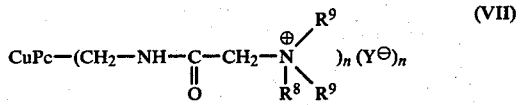 (VII)

where $R^9$ is $C_2$–$C_5$-alkyl, $R^8$ is 2-hydroxyethyl or benzyl and $Y^\ominus$ is $HO^\ominus$, acetate, methoxyacetate or lactate.

The novel compounds of the formula I are prepared by alkylating compounds I where n is 0 (=compounds Ia).

Compounds Ia are alkylated in a conventional manner, for example by reaction with the corresponding sulfuric acid diester, such as dimethyl sulfate or diethyl sulfate, the corresponding sulfonic acid ester, such as a $C_1$–$C_4$-alkyl toluenesulfonate or benzenesulfonate, a chloro-$C_2$- or $C_3$-alkanol, such as 2-chloroethanol or 2- or 3-chloropropanol, or ethylene oxide, epichlorohydrin or benzyl chloride.

Preferred alkylating agents are the methyl and ethyl esters of sulfuric acid and of benzenesulfonic and toluenesulfonic acid, and, in particular, 2-chloroethanol, ethylene oxide, epichlorohydrin and benzyl chloride.

The compounds Ia required as starting materials are advantageously obtained by reacting a dye

 (II)

(a) with an aminoacetamide or aminopropionylamide of the formula

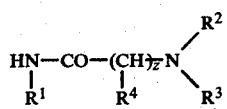 (III)

and anhydrous formaldehyde, or
(b) with the corresponding N-methylolamide

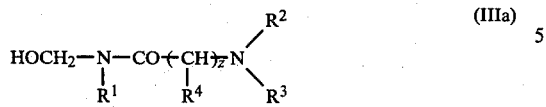  (IIIa)

in the presence of an acid. In the formulae III and IIIa, $R^1$, $R^2$, $R^3$, $R^4$ and z have the above meanings.

Not less than the stoichiometrically required amount of the compound III or IIIa, advantageously an excess, in the case of (III) together with anhydrous formaldehyde, is used. Formaldehyde can be used in monomeric form, but paraformaldehyde or trioxane is preferred.

The reaction is generally carried out at from 0° to 130° C., preferably at from 0° to 10° C. The reaction time depends on the number of acylamidomethylene groups to be introduced into II, the dye II, the acid and the temperature, and is generally from 1 to 50 hours.

Examples of acids which are suitable for the process and which at the same time can serve as the reaction medium are 80–100% strength by weight sulfuric acid or phosphoric acid, if necessary together with a dehydrating agent, such as sulfur trioxide (oleum), phosphorus pentoxide, meta- or poly-phosphoric acid, acetic anhydride or benzenesulfonic or toluenesulfonic acid. 96–100% strength by weight sulfuric acid or not more than 12% strength by weight oleum is the preferred acid, which at the same time serves as the reaction medium.

The amount of reaction medium is not critical, as long as the mixture is and remains mixable. The amount by weight of acid used is generally from 5 to 20 times the weight of II.

If sulfuric acid or oleum is used, sulfonic acid groups can, if desired, be introduced into the products during or after the reaction with III or IIIa by increasing the sulfuric acid concentration and/or by increasing the temperature. Dyes for paper should as a rule contain not more than on average 0–0.5 sulfonic acid groups per molecule, but preferably none, in order to retain their good bleeding-fastness.

The products of the formula Ia are isolated by discharging the reaction mixture onto water or ice-water and isolating (Ia) from the acid suspension, or rendering the resulting acid solution or suspension neutral or alkaline to not more than about pH 11 and separating off the precipitate, for example by filtration. The material on the filter is washed and dried, if necessary, or is further processed in the form of the water-moist filter cake.

If the products contain sulfonic acid groups, these are as a rule in the form of the potassium, sodium or ammonium salts.

The process gives the dyes Ia without dichlorodimethyl ether being formed.

In the Examples which follow and illustrate the present invention, parts and percentages are by weight. Unless indicated otherwise, the absorption maxima ($\lambda$max) of the dyes were determined in solutions containing 0.02 g of dye in 5% strength by weight acetic acid. CuPc=radical of copper phthalocyanine.

EXAMPLE 1

18.3 parts of the CuPc compound of the formula

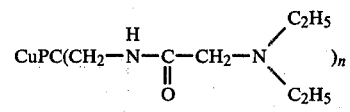

$\bar{n} = 1.5$ were introduced into 80 parts of ethylene chlorohydrin and the mixture was stirred at from 110° to 145° C. for 4 hours. The dye was precipitated by adding acetone, and was filtered off with suction and dried at 50° C.

Yield: 19.2 parts of the dye of the formula:

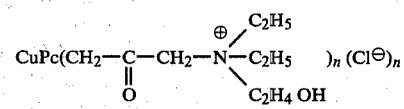

$\bar{n} = 1.5$ $\lambda$max: 324 and 605 nm.

Paper is dyed blue from aqueous solutions of the dye, and the effluent is colorless.

EXAMPLES 2 TO 6

Using the method described in Example 1, 18.3 parts of a compound of the formula

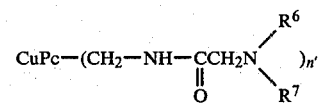

were reacted with 80 parts of ethylene chlorohydrin and the corresponding dye of the formula

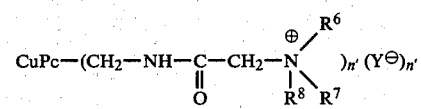

was isolated. The meanings of $R^6$, $R^7$, $R^8$, $Y^\ominus$ and n' are given in the Table, which also gives the absorption maximum determined in 5% strength acetic acid.

| Example | $R^6$ | $R^7$ | $R^8$ | $Y^\ominus$ | $\bar{n}'$ | $\lambda_{max}$ [nm] |
|---|---|---|---|---|---|---|
| 2 | —CH$_3$ | —CH$_3$ | —CH$_2$—CH$_2$OH | Cl$^\ominus$ | 1.3 | 325; 610.5 |
| 3 | —C$_3$H$_7$ | —C$_3$H$_7$ | —CH$_2$—CH$_2$OH | Cl$^\ominus$ | 2 | 325; |
| 4 | —C$_4$H$_9$ | —C$_4$H$_9$ | —CH$_2$—CH$_2$OH | Cl$^\ominus$ | 1.4 | 325; 610.5 |
| 5 | —(CH$_2$)$_4$— | | —CH$_2$—CH$_2$OH | Cl$^\ominus$ | 1.63 | 324; 609.5 |
| 6 | —(CH$_2$)$_2$—O—(CH$_2$)$_2$— | | —CH$_2$—CH$_2$OH | Cl$^\ominus$ | 1.4 | 325; 611.0 |

EXAMPLE 7

(a) 10.74 parts of the CuPc compound prepared in (b) were dissolved in 161 parts of 30% strength acetic acid at 45° C., and 5 parts of dimethyl sulfate were introduced a little at a time. The reaction mixture was stirred at 50° C. for 3 hours, after which a sample which had been precipitated with acetone and isolated dissolved completely in water. The quaternary dye was precipitated by adding acetone, and the precipitate was filtered off with suction, washed with a little acetone and dried at 50° C.

Yield: 11.3 parts of the dye of the formula:

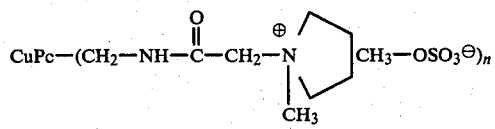

$\bar{n} = 1.3$.

$\lambda_{max}$: 325 and 611.5 nm.

(b) 86.1 parts of copper phthalocyanine were dissolved in 700 parts of 3% strength oleum at from 10° to 30° C., and 76.8 parts of 1-N-pyrrolidinylacetamide and 20 parts of paraformaldehyde were introduced side by side a little at a time. The mixture was stirred at 20°-30° C. for one hour, heated up from 30° to 100° C. in the course of one hour, stirred at 100°-103° C. for 15 hours, cooled to 25° C. and discharged onto ice-water. The solution was brought to pH 11 with dilute sodium hyroxide solution, and the precipitate was filtered off with suction, washed neutral and salt-free with water and dried at 100° C.

Yield: 99 parts of the CuPc compound of the formula:

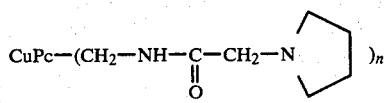

$\lambda_{max}$: 323 and 603 nm in 5% strength acetic acid.

EXAMPLE 8

(a) 12 parts of the CuPc compound obtained in (b) were dissolved in 181 parts of 30% strength acetic acid at 45° C., and 5 parts of dimethyl sulfate were added at this temperature. After 3 hours at this temperature, a sample dissolved readily in water. The reaction mixture was heated to 80° C. and left to cool, and the dye was precipitated with acetone. The precipitate was filtered off with suction, washed with acetone and dried at 60° C.

Yield: 12.5 parts of the dye of the formula:

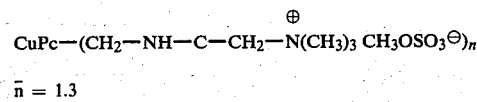

$\bar{n} = 1.3$ $\lambda_{max}$: 325 and 615 nm.

(b) 93 parts of 1-N-dimethylamino-acetamide and 25 parts of paraformaldehyde were introduced side by side into 625 parts of 0.5% strength oleum at from 10° to 30° C. in the course of 30 minutes, and the mixture was stirred at 30° C. for 30 minutes. 72 parts of copper phthalocyanine were added at this temperature, and the reaction mixture was stirred at 30° C. for one hour and at 103° C. for 9 hours, cooled to 20°-25° C. and discharged onto ice-water. The solution was neutralized with dilute sodium hydroxide solution and the precipitate was filtered off with suction, washed neutral and salt-free with water and dried at 100° C.

Yield: 101.5 parts of the CuPc compound of the formula:

$\bar{n} = 1.3$.

$\lambda_{max}$: 325 and 607 nm.

EXAMPLE 9

(a) The procedure described in Example 7 (a) was followed, but 10.9 parts of the CuPc compound obtained in (b) were used.

Yield: 13 parts of the dye of the formula

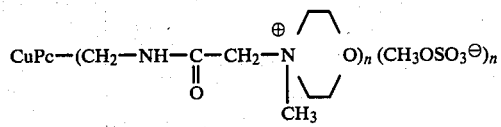

$\bar{n} = 1.4$ $\lambda_{max}$: 325 and 612.5 nm.

On paper, the dye gives blue dyeings with very good lightfastness.

(b) 86.1 parts of copper phthalocyanine were dissolved in 700 parts of 3% strength oleum at from 10° to 30° C., and 77.8 parts of 1-N-morpholinylacetamide and 20 parts of paraformaldehyde were introduced side by side a little at a time. The mixture was stirred at 20°-30° C. for one hour, heated up from 30° to 100° C. in the course of one hour, stirred at 100°-103° C. for 15 hours, cooled to 25° C. and discharged onto ice-water. The solution was brought to pH 11 with dilute sodium hydroxide solution, and the precipitate was filtered off with suction, washed neutral and salt-free with water and dried at 100° C.

Yield: 101.7 parts of the dye of the formula:

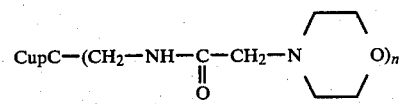

$\bar{n} = 1,4$ $\bar{n} = 1.4$ $\lambda_{max}$: 325 and 605 nm.

EXAMPLE 10

14.3 parts of the CuPc compound obtained in Example 7 (b) were dissolved in 150 parts of 30% strength acetic acid at 60° C. 1 part of the reaction product of 1 mole of nonylphenol with 14 moles of ethylene oxide was then added, followed by 6.4 parts of benzyl chloride. After 3 hours at 75° C., the dye was precipitated with 250 parts of a 4:1 mixture of isobutanol and methanol and was filtered off with suction. The material on the filter was washed with a little acetone and dried at 70° C.

Yield: 14.6 parts of the dye of the formula:

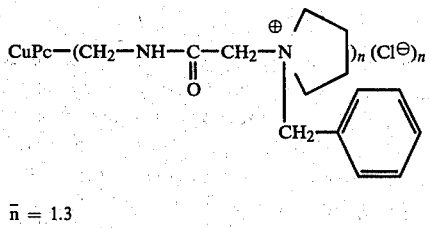

$\bar{n} = 1.3$ $\lambda_{max}$: 324 and 609.5 nm.

EXAMPLE 11

(a) The procedure described in Example 10 was followed, but 19.4 parts of the CuPc compound obtained in (b) were used. The dye was precipitated by adding acetone.

Yield: 17.4 parts of the dye of the formula:

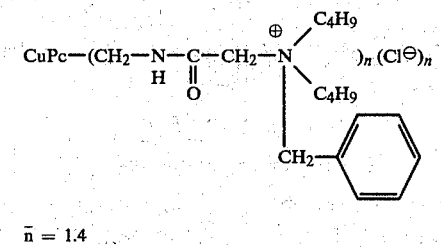

$\bar{n} = 1.4$ $\lambda_{max}$: 325 and 611 nm.

The dyeing obtained with the dye on paper has a very good bleeding-fastness (DIN No. 53,991).

(b) 0.3 part of 1-N-dibutylamino-acetamide and 25 parts of paraformaldehyde were introduced side by side into 625 parts of 0.5% strength oleum at from 10° to 30° C. in the course of 30 minutes, and the mixture was stirred at 30° C. for 30 minutes. 72 parts of copper phthalocyanine were added at this temperature, and the reaction mixture was stirred at 30° C. for one hour and at 103° C. for 9 hours, cooled to 20°–25° C. and discharged onto ice-water. The solution was neutralized with dilute sodium hydroxide solution, and the precipitate was filtered off with suction, washed neutral and salt-free with water and dried at 100° C.

Yield: 101.5 parts of the dye of the formula

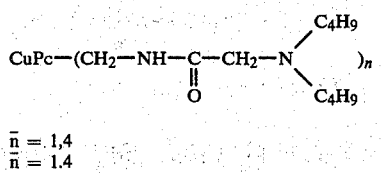

$\bar{n} = 1,4$
$\bar{n} = 1.4$ $\lambda_{max}$: 325 and 612 nm.

EXAMPLE 12

35 parts of the CuPc compound obtained in Example 7 (b) were dissolved in 500 parts of 30% strength acetic acid at 60° C., and the solution was transferred to a stirred pressure vessel. After flushing the vessel with nitrogen, the solution was heated to 80° C. and 30 parts of ethylene oxide were forced in. The reaction mixture was then heated to 110° C. and stirred at this temperature until a constant pressure had been established. The vessel was let down and the reaction mixture was cooled to 50° C., aqueous ammonia was added until precipitation was complete, and the precipitate was filtered off with suction, washed with 2% strength aqueous ammonia and dried a 60° C.

Yield: 32.5 parts of the dye of the formula:

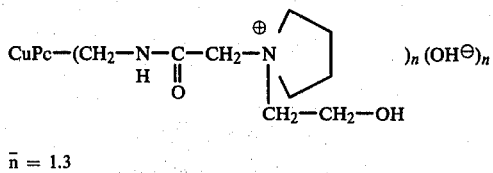

$\bar{n} = 1.3$ $\lambda_{max}$: 325 and 614 nm.

EXAMPLE 13

(a) The procedure described in Example 12 was followed, but instead of the CuPc compound prepared in Example 7 (b), 80 parts of the CuPc compound prepared in Example 11 (b) were used, in 800 parts of 30% strength acetic acid.

Yield: 72 parts of the dye of the formula:

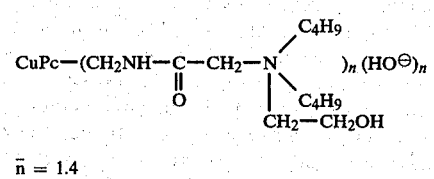

$\bar{n} = 1.4$ $\lambda_{max}$: 325 and 613.5 nm.

The dye is readily soluble in water, water/isopropanol and water/isobutanol.

(b) The procedure described under (a) was followed, but the CuPc compound of the formula:

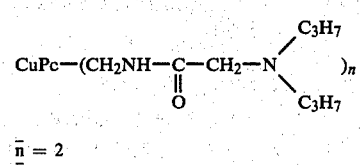

$\bar{n} = 2$
$\bar{n} = 2$ was reacted, to give the dye of the formula:

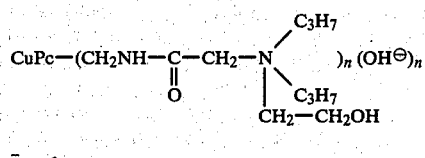

$\bar{n} = 2$.

EXAMPLE 14

24.3 parts of the CuPc compound obtained in Example 7 (b) were dissolved in 250 parts of 30% strength acetic acid at 80° C., 15 parts of epichlorohydrin were introduced, and the reaction mixture was stirred at 80° C. for 6 hours, after which a sample which had been precipitated with acetone and isolated was completely soluble in water. The dye was precipitated by pouring the mixture into acetone, and was filtered off, washed with acetone and dried.

Yield: 22 parts of the dye of the formula

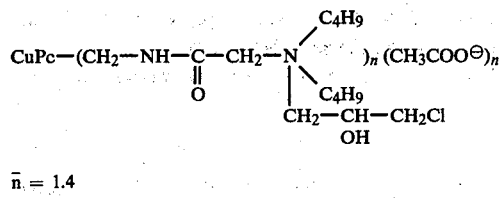

$\bar{n} = 1.4$

USE EXAMPLE 1

Wet-end dyeing of paper 25 kg of catalog paper (waste), 60 kg of bleached groundwood (65° C. Schopper Riegler) and 15 kg of unbleached sulfite pulp were pulped in 2,500 l of water in a pulper. 0.4% of soluble starch, 16% of kaolin and 2% of talc (based on the dry fiber) were added to the 4% strength aqueous pulp slurry. The pulp slurry was then beaten to 45° Schopper Riegler in a refiner. 12 kg of a 10% strength acetic acid solution of the dye from Example 13 (b) were added (=1% of dry dye, based on the dry fiber). After a drawing time of 15 minutes, resin size dispersion (quantity: 0.6% dry resin, based on the fiber) was added to the pulp. After 10 minutes, the pulp flowing out of the mixing vat was diluted continuously with water to a solids content of 0.8%, brought continuously to pH 4.5 (measured in the backwater) with alum ($Al_2(SO_4)_3.18H_2O$) and pumped into the head box.

Brilliant blue catalog paper (60 g/m$^2$) which had, according to DIN 53,991, very good bleeding-fastness and good lightfastness was obtained.

The paper can be decolorized virtually completely by treatment with sodium hypochlorite.

When, instead of the acetic acid solution of the dye from Example 12 (b), the corresponding amount of the dye from Example 12 (a) was used, dyed paper which was very bleeding-fast and lightfast was obtained.

USE EXAMPLE 2

Wet-end dyeing of paper 50 g of a mixture of bleached pine sulfate pulp and bleached birch sulfate pulp (70:30 parts) were pulped to a fiber suspension in 1 l of water (German hardness of 10°) at room temperature. The suspension was then diluted with 1 l of identical water. 2 g of a 10% strength acetic acid solution of the dye obtained in Example 12 to 10 g of water were added to the suspension, and the mixture was stirred until homogeneous. The suspension was then diluted with water to a solids content of 0.5%. 80 g/m$^2$ sheets of paper were produced from this suspension of a Franck laboratory sheet former, and the moist sheets were dried at 100° C. for 5 minutes. A reddish blue paper was obtained.

The effluent obtained during sheet-forming was colorless.

The dyed paper had a very good bleeding-fastness according to DIN No. 53,991, and was completely decolorized by treatment with sodium hypochlorite solution (2% of active chlorine, based on the paper).

The dyed paper obtained had a clearly superior bleeding fastness in the presence of dilute acetic acid, and a clearly superior lightfastness, to paper dyed in the same was with the dye of German Pat. No. 1,029,965, Example 1a.

Similar results were obtained when the dyes of Examples 2, 7 and 13 were used.

USE EXAMPLE 3

Wet-end dyeing of paper 15 kg of ligneous used paper, 25 kg of bleached groundwood and 10 kg of unbleached sulfate pulp were pulped to a 3% strength aqueous pulp slurry in a pulper. The pulp slurry was diluted to 2% in a dyeing vat. 0.5% of soluble, oxidatively degraded corn starch and 5% of kaolin, based on the dry total fiber, and 1.25 kg of a 5% strength solution of the dye from Example 8 (a) in acetic acid were then added in succession to this suspension. After 20 minutes, 1% (based on absolutely dry fiber) of a resin size dispersion was added to the pulp in the mixing vat. The homogeneous pulp suspension was brought to pH 5 with alum in the paper machine, just upstream of the head box.

Blue bag paper weighing 80 g/m$^2$ and with a dry finish, very good bleeding-fastness according to DIN No. 53,991 and good lightfastness was produced on the paper machine, and the effluent is colorless.

The paper can be decolorized virtually completely with hypochlorite.

USE EXAMPLE 4

Flexographic printing ink 5 parts of the dye obtained in Example 13 (a) were dissolved in a mixture of 47 parts of water, 47 parts of isopropanol and 1 part of methoxyacetic acid to give a low-viscosity flexographic printing ink.

Brilliant blue prints were obtained on a flexographic printing machine. The prints had outstanding water fastness according to DIN No. 16,524 and very good alkali, acid and oil fastness.

This result could not be predicted, since the dye is readily soluble in water and in water/isopropanol.

We claim:

1. A cationic phthalocyanine dye of the formula

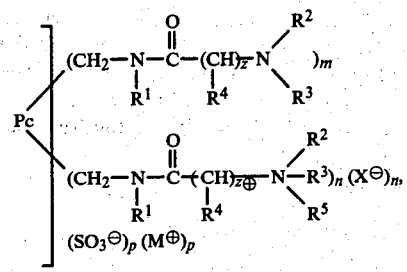

where Pc is an (n+m+p)-valent radical of a phthalocyanine, $R^1$ is hydrogen or $C_1$-$C_4$-alkyl, $R^2$ and $R^3$ independently of one another are $C_1$-$C_{14}$-alkyl, $C_2$-$C_4$-hydroxyalkyl, $C_5$-$C_8$-cycloalkyl, benzyl, phenyl or tolyl, or

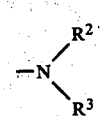

is a pyrrolidine, imidazole, 2-ethyl-4-methylimidazole, morpholine, piperazine or N'—$C_1$-$C_4$-alkylpiperazine radical, or is

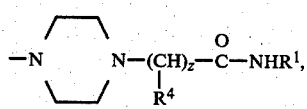

$R^4$ is hydrogen or methyl, $R^5$ is $C_1$–$C_{12}$-alkyl, $C_2$–$C_4$-hydroxyalkyl, chlorine-substituted $C_2$–$C_4$-hydroxyalkyl or benzyl, $X^\ominus$ is one equivalent of an anion, $M^\oplus$ is one equivalent of a cation, z is a 1 or 2, p is 0 or 1, m is 0 or 1 and n is 1, 2, 3 or 4, and $1<(m+n)<4$.

2. A dye as claimed in claim 1, wherein Pc is an $(m+n+p)$-valent radical of copper phthalocyanine.

3. A dye as claimed in claim 1 or 2, wherein $R^1$ and $R^4$ are hydrogen.

4. A dye as claimed in claim 1 or 2, wherein $R^2$ and $R^3$ are $C_1$–$C_5$-alkyl, or

is morpholinyl, piperidinyl or pyrrolidinyl, and $R^5$ is $C_1$–$C_4$-alkyl, 2-hydroxyethyl, 2-hydroxy-3-chloropropyl or benzyl and $X^\ominus$ and $Cl^\ominus$, $H_3COSO_3^\ominus$, benzenesulfonate, toluenesulfonate, acetate, methoxyacetate, lactate or $HO^\ominus$.

5. A dye as claimed in claim 3, wherein $R^2$ and $R^3$ are $C_1$–$C_5$-alkyl, or

is morpholinyl, piperidinyl or pyrrolidinyl, and $R^5$ is $C_1$–$C_4$-alkyl, 2-hydroxyethyl, 2-hydroxy-3-chloropropyl or benzyl and $X^\ominus$ is $Cl^\ominus$, $H_3COSO_3^\ominus$, benzenesulfonate, toluenesulfonate, acetate, methoxyacetate, lactate or $HO^\ominus$.

6. A dye as claimed in claim 3, wherein the average value of p is from 0 to 0.5.

7. A dye as claimed in claim 4, wherein p is 0.

8. A cationic phthalocyanine dye of the formula:

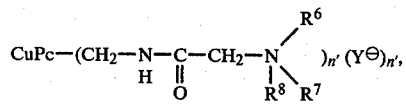

where n' is 1, 2 or 3, $R^6$ and $R^7$ are $C_1$–$C_5$-alkyl, or

is morpholinyl or pyrrolidinyl, and $R^8$ is $C_1$–$C_4$-alkyl, 2-hydroxyethyl, 2-hydroxy-3-chloropropyl or benzyl and $Y^\ominus$ is $HO^\ominus$, benzenesulfonate, toluenesulfonate, $H_3COSO_3^\ominus$, $Cl^\ominus$, acetate, methoxyacetate or lactate.

9. A cationic dye as claimed in claim 8, wherein

is di-n-propylamino, di-n-butylamino or pyrrolidinyl, $R^8$ is 2-hydroxyethyl or benzyl and $Y^\ominus$ is $HO^\ominus$, acetate, methoxyacetate or lactate.

* * * * *